United States Patent
Bouchard et al.

(10) Patent No.: US 10,401,573 B2
(45) Date of Patent: Sep. 3, 2019

(54) AFFIXING FIBER OPTIC SENSING ELEMENT TO AN APPARATUS

(71) Applicant: OFS Fitel, LLC, Norcross, GA (US)

(72) Inventors: Kevin G Bouchard, Bristol, CT (US);
Robert S Dyer, East Granby, CT (US);
Michael J Hines, Ivoryton, CT (US);
Andrei A Stolov, Simsbury, CT (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/935,643

(22) Filed: Mar. 26, 2018

(65) Prior Publication Data

US 2018/0292611 A1    Oct. 11, 2018

Related U.S. Application Data

(60) Provisional application No. 62/482,285, filed on Apr. 6, 2017.

(51) Int. Cl.
| | | |
|---|---|---|
| G02B 6/36 | (2006.01) | |
| G01K 11/32 | (2006.01) | |
| G01L 1/24 | (2006.01) | |
| G02B 6/44 | (2006.01) | |

(52) U.S. Cl.
CPC ........ *G02B 6/3628* (2013.01); *G01K 11/3206* (2013.01); *G01L 1/246* (2013.01); *G01K 11/32* (2013.01); *G02B 6/3636* (2013.01); *G02B 6/4415* (2013.01)

(58) Field of Classification Search
None
See application file for complete search history.

(56) References Cited

U.S. PATENT DOCUMENTS

2011/0290477 A1*  12/2011  Jaaskelainen ......... E21B 17/026
166/250.01

* cited by examiner

*Primary Examiner* — Jerry Rahll
(74) *Attorney, Agent, or Firm* — David Rodrigues; Cantor Colburn LLP

(57) ABSTRACT

Embodiments are directed to a method and device for coupling an optical fiber sensing element to an apparatus under test. A channel is affixed to the apparatus under test. The channel is partially filled with a coupling material. The fiber optic sensing element is placed on the coupling material. Coupling material is placed in the channel to uniformly surround the fiber optic sensing element and tightly couple the fiber optic sensing element to the apparatus under test.

18 Claims, 3 Drawing Sheets

AFFIXING FIBER OPTIC SENSING ELEMENT TO AN APPARATUS

CROSS-REFERENCE TO RELATED APPLICATIONS

This application claims priority to U.S. Provisional Patent Application Ser. No. 62/482,285, filed Apr. 6, 2017, which is hereby incorporated by reference in its entirety.

BACKGROUND

The embodiments described herein relate in general to the field of fiber optics. More specifically, the embodiments described herein relate to affixing a fiber optic sensing element to monitor the structural integrity of an apparatus.

Optical fibers have been used in communication systems to transmit information. Recently, optical fibers have been used for sensing purposes. Fiber optic sensors use optical fibers (also referred to as fiber optic cables) as sensing elements. Such sensing is based on the fact that changes in the environment surrounding the optical fiber affect the transmitted or back scattered optical signal within the fiber. Such a technology has a variety of advantages. For example, fiber optic sensors have higher signal bandwidth, are immune to electromagnetic interferences, provide safe operation (for example, no electric sparks are present, and thus can be used in a hazardous area), and are easy to install. In addition, fiber optic sensing is distributed, in that measurements can be made throughout the length of a fiber optic cable. In such a manner, measurements can be achieved in the range of 10 kilometers or more. The installation is simple in that there is no need for multiple wires to transmit data over such great distances. A single fiber optic distributed sensor can be equivalent to thousands of point sensors. Various techniques can be used to increase the range of such a distributed sensor.

SUMMARY

Embodiments are directed to a method and device for coupling an optical fiber sensing element (e.g., optical fiber or fiber Bragg grating array, buffered optical fiber or buffered fiber Bragg grating array, fiber optic cable or cabled fiber Bragg grating array), heretofore referred to as sensor element, to an apparatus under test. A channel is affixed to the apparatus under test. The channel is partially filled with a coupling material. The optical fiber sensing element is placed on, or in, the coupling material. Coupling material is placed in the channel to uniformly surround the fiber optic sensing element and tightly couple the fiber optic sensor to the apparatus under test.

A device for coupling an optical fiber sensing element to an apparatus under test can comprise a channel securely coupled to the apparatus under test. The device can further comprise a coupling material substantially uniformly distributed within the channel. The optical fiber sensor is placed within the channel with the coupling material substantially uniformly surrounding the optical fiber within the channel to securely and tightly couple the fiber optic sensing element to the apparatus under test.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
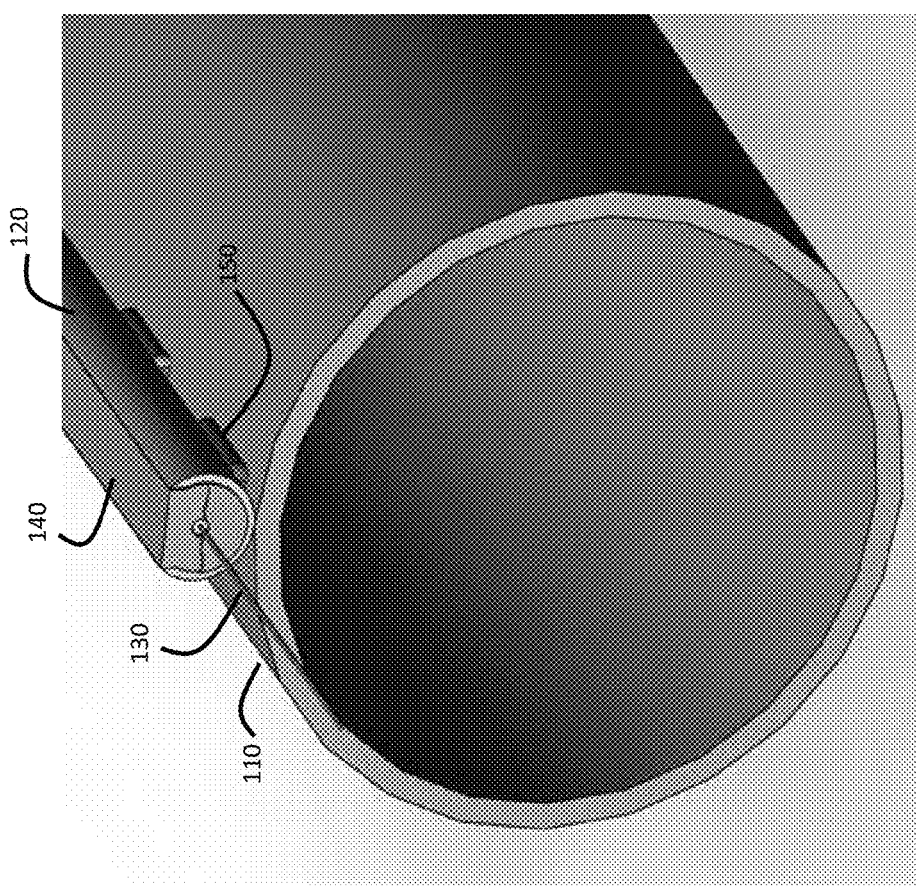
FIG. 1 is an isometric view illustrating the affixment of a fiber optic sensing element to an apparatus in one or more embodiments.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Various types of sensors can be created using fiber optic cables. For example, distributed temperature sensing (DTS) relies on the fact that the physical environment (including temperature and pressure) can affect fibers and locally change the interactions of light via Raman scattering in the fiber. In general, fiber optics work by transmitting light through the fiber. DTS operates by transmitting a pulse of light through the fiber and measuring backscattered light. Different temperatures backscatter light with different spectral distribution.

Another type of sensor that utilizes fiber optics is the strain sensor. One type of strain sensor uses a Bragg grating of the fiber. As strain is applied to the fiber, the optical spectrum center wavelength reflected by the Bragg grating shifts in wavelength. This shift in wavelength can be converted to units of strain, allowing one to measure strain, compression, and/or pressure along large portions of the optical fiber. Other types of fiber optic strain sensors can be used.

One issue that can occur is poor coupling between a fiber and the structure being evaluated. A fiber optic that is configured to measure strain on a structure (such as an oil well or a bridge) is affixed to the structure at certain points. If the affixment to the structure does not provide 100% coupling, then there can be erroneous data on the structural integrity of the structure being monitored.

In some embodiments, a solution to this issue is to couple the fiber optic sensing element to the structure being tested in a more secure manner. The fiber optic sensing element may be a single fiber or a cable that incorporates one or more single-core or multicore optical fibers.

With reference to FIG. 1, an isometric view of one or more embodiments is presented. It is desired to measure the stress along apparatus under test 110. The "apparatus under test" may also be considered as an "apparatus under pressure" or an "apparatus under stress". Apparatus under test 110 can be a structure such as a bridge, a structural member of a building, an oil well pipe, or various other structures where it is desired to determine stress.

Coupled to the apparatus under test 110 is a channel 120. The channel 120 is in mechanical communication with the apparatus under test 110. Channel 120 can be constructed of one of a variety of different materials. The channel 120 may comprise a metal, a ceramic or a polymer.

Examples of metals include iron, copper, aluminum, titanium, zirconium, and alloys of iron, copper, aluminum, titanium, and zirconium. An example of a metal alloy is carbon steel or stainless steel. Examples of ceramics include silica, titania, alumina, zirconia, or combinations thereof.

Polymers that have a glass transition temperature of greater than 100° C. may be used to form the channel 120. The polymers may be filled with additives that improve dimensional and thermal stability. Examples of such polymers include polycarbonate, polyimides, polyetherimides, polysulfides, polysulfones, polypropylene oxide, polyesters, or a combination thereof. Examples of fillers include carbon fibers, carbon nanotubes, silica, alumina, titania, or combinations thereof.

In some embodiments, a steel such as a carbon steel or a stainless steel is used as channel 120. In some embodiments, a carbon fiber material or any other suitable material can be used. In some embodiments, the channel is a C-channel such that the channel is in the shape of the letter C. In some embodiments, the channel has a substantially semi-circular profile, with an opening that allows for the insertion of a fiber. In some embodiments, other channel shapes that have an opening disposed on one side also can be used, such as rectangular, elliptical, and the like. In some embodiments, the profile of the channel can be a complete circular, ellipsoid, V-shape or a rectangular shape.

In some embodiments, the fiber 130 is coupled to channel 120 through the use of an adhesive 140. Thermoplastic or crosslinkable polymers may be used as the adhesive. It is generally for the adhesive to return to its original dimensions after the sensor is strained up to 2% of its original length. Examples of crosslinkable polymers include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination comprising at least one of the foregoing crosslinkable polymers.

Adhesive 140 serves to bind fiber 130 to channel 120. By binding fiber 130 to channel 120, any elongation of channel 120 causes the fiber 130 to receive the stress. Thus, the elongation is measurable due to the coupling of fiber 130 to channel 120. The amount of adhesive 140 used can vary. In some embodiments, the volume of the adhesive 140 is at least twenty times the volume of the fiber 130. In some embodiments, the volume of the adhesive is at least 50 times the volume of the fiber 130.

In some embodiments, channel 120 is securely affixed to the apparatus under test 110 via affixment 150. Affixment 150 can be one of a variety of different affixment methods. In some embodiments, affixment 150 is a weld joint. In some embodiments, affixment 150 is an adhesive. Other methods of affixment such as, for example, brazing, threaded fasteners, and the like, may be used. In some embodiments, a combination of affixment methods can be used.

Figure 2:
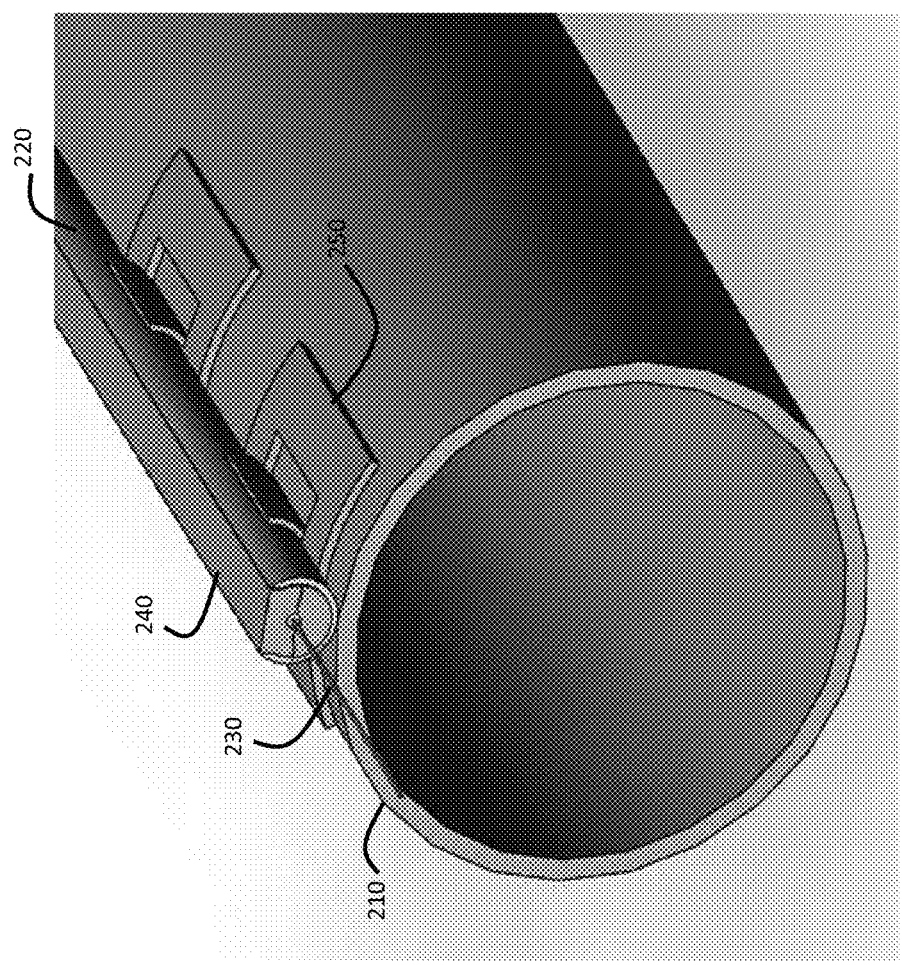
FIG. 2 is an isometric view illustrating the affixment of a fiber optic sensor to an apparatus in one or more embodiments.

With respect to FIG. 2, an affixment for coupling a channel to a device under test is shown for one or more embodiments. Apparatus 210 is the apparatus under test, similar to apparatus 110 of FIG. 1. Channel 220 is similar to the channel 120 of FIG. 1. As before, fiber 230 is coupled to channel 220 through the use of an adhesive 240.

Affixment 250 is a clip that is coupled to apparatus 210. The coupling can be in one of a variety of different manners. For example, affixment 250 can be welded to apparatus 210 or glued to apparatus 210.

Thereafter, channel 220 can be coupled to affixment 250. This coupling can be accomplished in one of a variety of different manners. In some embodiments, channel 250 can be welded or adhered to affixment 250. In some embodiments, channel 220 can be pressure fit with affixment 250. For example, there can be indentations in channel 220 that mate with areas of affixment 250 such that affixment 250 applies gripping force to channel 220.

Figure 3:
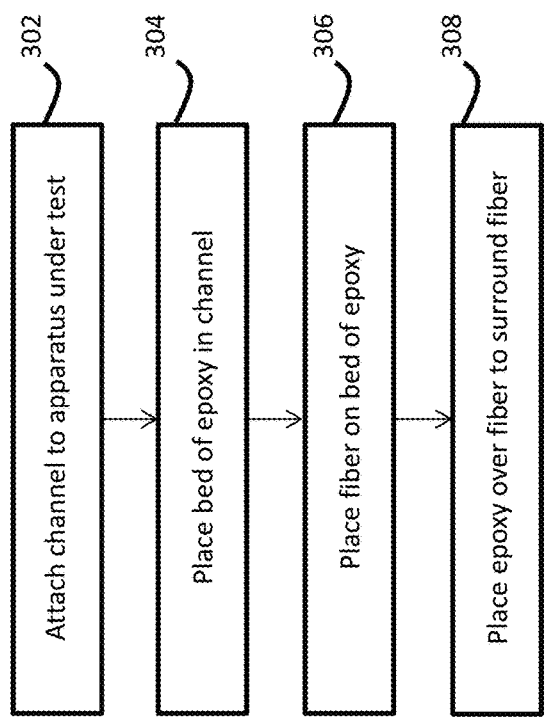
FIG. 3 is a flowchart illustrating the steps of one or more embodiments.

A flowchart illustrating a method 300 of coupling a fiber optic sensor to an apparatus under test is presented in FIG. 3. Method 300 is merely exemplary and is not limited to the embodiments presented herein. Method 300 can be employed in many different embodiments or examples not specifically depicted or described herein. In some embodiments, the procedures, processes, and/or activities of method 300 can be performed in the order presented. In other embodiments, one or more of the procedures, processes, and/or activities of method 300 can be combined or skipped.

At block 302, a channel is affixed to the apparatus under test. This affixment can take place in one of a variety of different manners, such as by welding or through the use of an adhesive. In some embodiments, more than one channel can be coupled to the apparatus under test.

In some embodiments, the channel is affixed to the apparatus under test at regular intervals. In some embodiments, the channel is affixed to the apparatus under test approximately every 10 to 100 centimeters. In some embodiments, the channel is continuously affixed to the apparatus under test.

At block 304, a bed of an adhesive is laid in the channel. The adhesive can have a variety of different characteristics. The most important parameter is the Shore D hardness value. In an embodiment, the Shore D hardness of the adhesive is greater than 85, preferably greater than 90, and more preferably greater than 95. In some embodiments, the adhesive can be laid to fill approximately half the channel.

At block 306, one or more optical fibers or cables are laid on the adhesive in the channel. The fibers can be used for evaluation of any type of strain, pressure, or compression sensor. Sensor fibers can be used that are optimized to measure acoustic signals. In such embodiments, a single mode fiber may be used. Any number of fibers can be laid on the adhesive. In some embodiments, multiple fibers can be used for redundancy purposes, such that a backup fiber is present. In some embodiments, multiple fibers or multicore fibers can be used. This plurality of fibers can be optimized to measure different characteristics, such as one or more fibers to measure strain and one or more fibers, or multicore fibers, to measure acoustic signals. In some embodiments, one or more fibers can be used to measure temperature.

At block 308, the adhesive is placed over the one or more sensor fibers. This layer of adhesive serves to completely surround the one or more sensor fibers to ensure uniform axial coupling of the sensor to the channel and therefore to the structure under test.

The adhesive serves to bond the sensor fiber to the channel. In some embodiments, at least one of the one or more fibers can be loosely coupled to the channel. As described above, a tight coupling between the fiber and the channel can result in more accurate strain measurements. The tight coupling can be provided by completely surrounding the fiber with a large volume of adhesive. However, a tight coupling between the fiber and the channel can adversely affect temperature measurements, because fibers that measure temperature can be sensitive to strain.

A loose coupling of one or more fibers to the channel can allow the uncoupled fiber to make temperature or other measurements without having to worry about the effects of strain on the fiber. In some embodiments, a tightly-coupled fiber can be used along with a loosely-coupled fiber. The tightly-coupled fiber measures both temperature and strain. The loosely coupled fiber measures temperature. Since strain also affects temperature, strain can be computed from the strain/temperature combination.

A loose coupling can occur in one of a variety of different manners. In some embodiments, the loosely-coupled fiber is affixed to the outside of the channel in a traditional manner, such as being adhered at a periodic interval. In some embodiments, the loosely-coupled fiber is placed in a larger tube such that the loosely-coupled fiber floats within the larger tube. The larger tube is placed in the adhesive in the manner described above. In such a manner, while the larger tube is tightly coupled to the channel via the adhesive, the fiber is not tightly coupled and is less affected by strain.

The adhesive used for coupling fiber optic sensing elements to the pipe may have different chemistry, including thermosets, thermoplastics, UV-curable or other formulation types. Characteristics that have been found to be effective include a high adhesion and a high hardness (Shore D>85).

In some embodiments, there can be one or more coating agents added to the fiber. The coating agents would be used to enhance the coupling between the fiber and the adhesive. Such coating agents could be used wherever adhesive is used, such as between the channel and the apparatus under test.

In summary, a novel method and system of tightly coupling a fiber to an apparatus under test is proposed to increase coupling between a measuring fiber to the apparatus. A channel is coupled to an apparatus under test at regular intervals. The channel is partially filled with an adhesive, upon which one or more measuring fibers is placed. The adhesive is then used to uniformly surround the fiber. The adhesive serves to tightly couple the fiber to the channel and thus to the apparatus under test to provide more accurate strain measurements.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of coupling a fiber optic sensing element to an apparatus under test comprising:
    affixing a channel to the apparatus under test;
    partially filling the channel with a coupling material;
        wherein the coupling material is an adhesive having a Shore D hardness of greater than 85;
    placing the fiber optic sensing element on the coupling material;
    placing a coupling material in the channel to uniformly surround the fiber optic sensing element and coupling the fiber optic sensor to the apparatus under test.

2. The method of claim 1, wherein the fiber optic sensing element is a single mode fiber optimized to sense strain.

3. The method of claim 2, wherein the single mode fiber comprises a Bragg grating.

4. The method of claim 1, wherein the fiber optic sensing element is optimized to sense acoustic signals.

5. The method of claim 1, wherein the fiber optic sensing element further comprises a plurality of fiber optic sensors.

6. The method of claim 5, wherein at least one fiber optic sensing element of the plurality of fiber optic sensors is loosely coupled to the apparatus under test to minimize strain on the optical fiber.

7. The method of claim 6, further comprising:
    placing the at least one optical fiber in a tube, where the tube is a component of the fiber optic sensing element;
    placing the tube on the coupling material; and
    placing coupling material on the tube to uniformly surround the tube while the at least one fiber optic sensing element is loosely coupled to the tube.

8. The method of claim 1, wherein affixing a channel to the apparatus under test comprises:
    affixing the channel at regular intervals to the apparatus under test.

9. There method of claim 8, wherein the regular interval is approximately 100 centimeters.

10. The method of claim 8, wherein affixing the channel comprises affixing the channel to the apparatus under test via welding.

11. The method of claim 8, wherein affixing the channel comprises affixing the channel to the apparatus under test via adhesive.

12. The method of claim 8, wherein affixing the channel comprises affixing a clip to the apparatus under test at the regular intervals; and
    securely affixing the channel to the clip.

13. A device for coupling an optical fiber sensing element to an apparatus under test comprising:
    a channel securely coupled to the apparatus under test; and a coupling material substantially uniformly distributed within the channel; wherein the coupling material is an adhesive having a Shore D hardness of greater than 85; and wherein:

the optical fiber sensing element is placed within the channel with the coupling material substantially uniformly surrounding the optical fiber within the channel to securely and tightly couple the fiber optic sensing element to the apparatus under test.

14. The device of claim 13, wherein:

the fiber optic sensing element comprises a plurality of optical fibers or cables; and at least one optical fiber of the plurality of fiber optic sensing elements is loosely coupled to the apparatus under test to minimize strain on the optical fiber.

15. The device of claim 14, further comprising:

a tube placed within the coupling material; wherein:

at least one optical fibers of the plurality of fiber optic sensing elements is placed within the tube to loosely couple the at least one optical fiber of the plurality of optical fibers to the apparatus under test.

16. The device of claim 13, wherein the channel comprises a C-channel with an opening disposed at a side opposite the coupling of the channel to the apparatus under test; and wherein the opening is configured to allow a partial deposit of the coupling material, a placement of the fiber optic sensing element on the coupling material, and a surrounding of the fiber optic sensing element with the coupling material.

17. The device of claim 13, wherein the channel is affixed to the apparatus under test at regular intervals via welding.

18. The device of claim 13, wherein the channel is affixed to the apparatus under test at regular intervals via clips that are coupled to the apparatus at the regular intervals.

* * * * *